Figure 1:
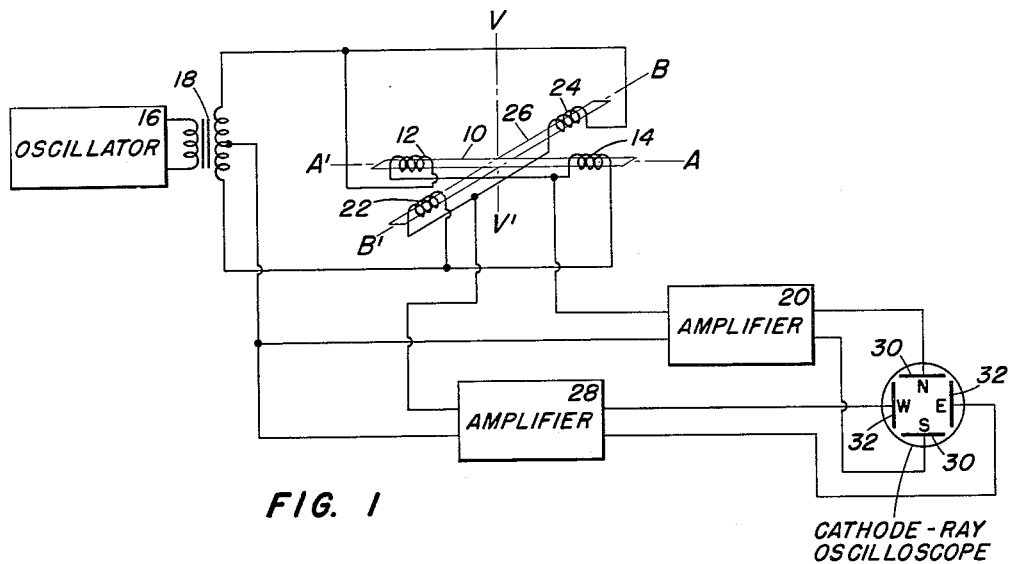

April 17, 1956  W. C. ANDERSON  2,741,853
MAGNETOMETER COMPASS
Filed Aug. 25, 1944

Inventor
WILMER C. ANDERSON

By
F. J. Schmitt
Attorney

United States Patent Office 2,741,853
Patented Apr. 17, 1956

2,741,853

MAGNETOMETER COMPASS

Wilmer C. Anderson, Douglaston, N. Y., assignor to the United States of America as represented by the Secretary of the Navy Application August 25, 1944, Serial No. 551,173

1 Claim. (Cl. 33—204)

This invention relates to compasses, and more particularly to compasses wherein magnetometers are utilized as the directionally sensitive element.

Magnetic compasses of various types have long been used in ships, aircraft and other carriers for navigational purposes. In general, such compasses comprise a magnetized element mounted for rotation about a substantially vertical axis and means whereby the direction of the element in respect to a reference line, rotationally fixed in the carrier, may be determined. In cases where the carrier does not afford a stable platform for the compass, a stabilizing system whereby the plane of rotation of the compass element is maintained horizontal must be provided. Such stabilization is accomplished in some cases by means of simple gimbal systems and in others by means of gyrostabilizers.

Compasses employing a rotatably mounted magnetized element as the directionally sensitive device suffer from erratic performance due to the inertia of the magnetized element. Thus after the carrier has turned or otherwise altered its course or attitude, such compasses may overshoot and hunt for an appreciable time, thus rendering their use impracticable when indications of direction are most needed. In addition, such compasses are not, in general, suitable for use with remote indicators and must accordingly be mounted at the location of the operator of the carrier, for example on the bridge of a vessel or in the cockpit of an aircraft. Such locations may not be suitable due to the presence of other instruments or large masses of metal which may produce relatively large interfering magnetic fields.

It is an object of the present invention to provide a compass the directionally sensitive element of which is inertialess. It is a further object of the invention to provide a compass which may be mounted in a magnetically ideal location in the carrier and provide indications at a remote operating position.

Accordingly, there is provided a magnetometer compass comprising a vertically stabilized axis; substantially identical magnetometers arranged to measure components of the earth's magnetic field in two mutually perpendicular directions each perpendicular to the axis, each magnetometer being arranged to measure magnetic fields in a chosen direction and produce a periodic pulse output, and the amplitude and polarity of the pulses depending respectively upon the magnitude and polarity of the magnetic field in the chosen direction; and means for combining the two magnetometer outputs to obtain a quantity proportional to the vector sum of the magnetic fields in the two mutually perpendicular directions.

Figure 2:
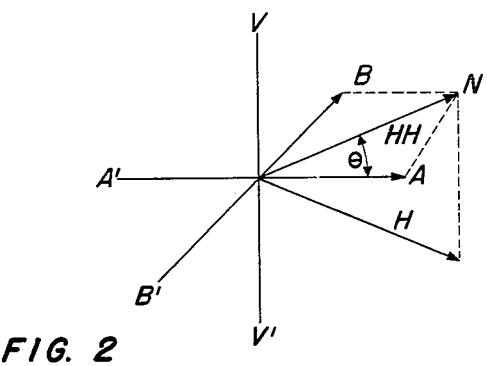

In the accompanying drawing:

Fig. 1 is a schematic diagram of a magnetometer compass in accordance with the invention; and Fig. 2 is a vetor diagram illustrating the operation of the compass of Fig. 1.

In Fig. 1, VV' represents a vertically stabilized axis. Conveniently, stabilization of this axis may be effected by a gyro-stabilizer (not shown) of conventional type mounted in the carrier. Axes AA' and BB', fixed in respect to axis VV', are mutually perpendicular and also perpendicular to axis VV'. Since the VV' axis is stabilized vertically, axes AA' and BB' define a horizontal plane which maintains its horizontal orientation irrespective of maneuvers by the carrier. Axes AA' and BB' may be chosen respectively parallel to the horizontal projections of the longitudinal and transverse axes of the carrier. The positive angle measured from the horizontal projection of the earth's magnetic vector to axis AA' then represents the magnetic heading of the carrier. In order to obtain information as to variations in this angle in a form convenient for transmission to a remote indicator, two magnetometers are used respectively to measure magnetic field components along the AA' and BB' axes.

The magnetometers may be of any convenient type capable of producing a periodic pulse output in which the amplitude and polarity of the pulses depend upon the magnitude and polarity of the applied magnetic field. In the arrangement of Fig. 1, the magnetometers are of the general type disclosed in copending application Serial No. 534,961, filed May 10, 1944 (Balanced Magnetometer, Henry B. Riblet). Accordingly, the magnetometer for measuring field components along axis AA' includes a magnetometer element 10 comprising a strip of high-permeability material upon which is wound a pair of matched pickup coils 12 and 14. These coils are connected in series opposition and are excited by means of an oscillator 16 through a transformer 18 having a center-tapped secondary winding. The excitation provided by oscillator 16 is conveniently of such magnitude that the strip of the magnetometer element is driven into saturation twice during each excitation cycle. Accordingly, there is produced across the bridge formed by coils 12 and 14 and the two halves of the secondary winding of transformer 18 a series of unipolar pulses, the amplitude and polarity of which depend upon the magnitude and polarity of the magnetic field in the direction of the magnetometer element. The output of the bridge is applied to an amplifier 20 which serves merely to provide voltage amplification of the input signal.

The second magnetometer, which is arranged to measure magnetic field components along axis BB', is similar in all respects to the magnetometer just described and is driven in phase therewith, conveniently by the same oscillator. Accordingly, coils 22 and 24, wound on magnetometer-element strip 26, are also connected in series opposition across the secondary winding of transformer 18 and the output of the bridge circuit including these coils is applied to amplifier 28.

Reference is made to Fig. 2 which will assist in the understanding of the operation of the system thus far described. Mutually perpendicular axes AA' and BB' indicate the orientations of magnetometer elements 10 and 26, respectively, in a horizontal plane. The direction of the horizontal component of the earth's magnetic field is indicated by the vector marked $H_H$, terminating at N and having its origin at the intersection of axes AA' and BB'. Angle $\theta$ is a measure of the direction of axis AA' in respect to the horizontal component $H_H$ of the earth's magnetic field. Thus it will be seen that the effective component of the earth's magnetic field along magnetometer element 10 is proportional to the cosine of angle $\theta$, while that along magnetometer element 26 is proportional to the sine of the same angle.

From the above, it will be understood that, as the carrier moves in a circle, the output of amplifier 20 will vary in accordance with the cosine of the heading angle $\theta$ measured from north, and the output of amplifier 28 will vary in accordance with the sine of the same angle. Accordingly, when the carrier is on a magnetic north heading, the output of amplifier 20 will be maximum, while that of amplifier 28 will be zero. As the carrier makes a right turn, the output of amplifier 20 will decrease while that of amplifier 28 increases, and when a 90-degree turn has been completed, the output of amplifier 28 will be maximum. It will recognized, therefore, that the vector sum of the output voltages of amplifiers 20 and 28 is a measure of the direction of the horizontal component of the earth's magnetic field. Relationships similar to the above hold also in the second, third and fourth quadrants, the vector sum of the two magnetometer outputs varying appropriately with the heading of the carrier.

In order to perform the vector addition of the two magnetometer output signals, a cathode-ray oscilloscope is used. Accordingly, the output of amplifier 20 (Fig. 1) is applied to the horizontal plates 30 of a cathode-ray oscilloscope, which may be remotely located, while the output of amplifier 28 is applied to the vertical plates 32 of the same oscilloscope. The gains of the two systems are adjusted in such fashion that equal magnetic fields along axes AA' and BB' will produce equal deflections of the cathode-ray beam of the oscilloscope. Under these conditions the trace produced by the oscilloscope is a straight line which will rotate as the carrier turns. This trace rotates in the same way that the horizontal component of the earth's magnetic vector rotates in respect to the axes AA' and BB', which are respectively parallel to the longitudinal and transverse axes of the carrier. If the vertical axis of the oscilloscope represents axis AA', the cardinal headings will be as shown in Fig. 1, the trace rotating about the center of the oscilloscope screen in true simulation of the indication of a conventional compass.

It will be understood that various types of magnetometers may be used in the compass of the invention. Thus the so-called second-harmonic magnetometer may be substituted for the balanced magnetometer employed in the compass described above. In the second-harmonic magnetometer, the second-harmonic content of the pulse output of the magnetometer-element bridge is isolated by means of a tuned amplifier. The output of the amplifier in this case is a sine wave the phase and amplitude of which vary in accordance with the polarity and magnitude of the applied magnetic field. If this output signal is half-wave rectified, it is of essentially the same form as that produced by the balanced magnetometer. The second-harmonic magnetometer may, therefore, be used in similar fashion to produce a rotating vector trace on the cathode-ray oscilloscope.

What is believed to be new and useful is:

A magnetometer compass comprising two mutually perpendicular magnetometer elements including two strips of high-permeability material and a pair of matched pick-up coils wound about each strip and connected in series opposition, said magnetometer elements serving as the directionally sensitive elements of the compass, a transformer the secondary of which is connected to the free ends of both pairs of pick-up coils so as to form two bridge networks, the output of the transformer being sufficient to saturate the strips twice per cycle, and a cathode-ray oscilloscope having one pair of deflection plates connected across the diagonal of each bridge defined by the center tap of the transformer secondary and the junction between the pick-up coils.

References Cited in the file of this patent

UNITED STATES PATENTS

| | | |
|---|---|---|
| 1,992,100 | Stein | Feb. 19, 1935 |
| 2,016,977 | Thomas | Oct. 8, 1935 |
| 2,261,309 | Stuart | Nov. 4, 1941 |
| 2,373,096 | Bonnell | Apr. 10, 1945 |
| 2,374,166 | Beach | Apr. 24, 1945 |
| 2,375,227 | Hillman | May 8, 1945 |
| 2,383,460 | Purves et al. | Aug. 28, 1945 |
| 2,435,276 | Holmes | Feb. 3, 1948 |
| 2,476,273 | Beach | July 19, 1949 |

FOREIGN PATENTS

| | | |
|---|---|---|
| 451,850 | Great Britain | Aug. 10, 1936 |